United States Patent
Tischler

(12) 
(10) Patent No.: US 8,304,698 B1
(45) Date of Patent: Nov. 6, 2012

(54) THERMAL THROTTLING OF PERIPHERAL COMPONENTS IN A PROCESSING DEVICE

(75) Inventor: Brett A. Tischler, Longmont, CO (US)

(73) Assignee: Globalfoundries Inc.

( * ) Notice: Subject to any disclaimer, the term of this patent is extended or adjusted under 35 U.S.C. 154(b) by 1807 days.

(21) Appl. No.: 11/299,071

(22) Filed: Dec. 9, 2005

(51) Int. Cl.
H05B 1/02 (2006.01)

(52) U.S. Cl. .......................... 219/497; 219/481; 219/494

(58) Field of Classification Search ................. 219/481, 219/494, 492, 501, 479, 483–486; 713/300, 713/501
See application file for complete search history.

(56) References Cited

U.S. PATENT DOCUMENTS

| | | | |
|---|---|---|---|
| 5,422,806 A | 6/1995 | Chen et al. | |
| 5,948,106 A | 9/1999 | Hetherington et al. | |
| 5,978,864 A | 11/1999 | Hetherington et al. | |
| 6,393,374 B1 | 5/2002 | Rankin et al. | |
| 6,535,798 B1 | 3/2003 | Bhatia et al. | |
| 6,651,176 B1 | 11/2003 | Soltis, Jr. et al. | |
| 6,871,119 B2 | 3/2005 | Samson et al. | |
| 2002/0083354 A1 | 6/2002 | Adachi | |
| 2003/0126479 A1* | 7/2003 | Burns et al. | 713/300 |
| 2004/0128101 A1 | 7/2004 | Hermerding, II | |
| 2004/0215988 A1 | 10/2004 | Clabes et al. | |
| 2005/0125701 A1 | 6/2005 | Hensbergen et al. | |
| 2005/0198538 A1 | 9/2005 | Soltis, Jr. et al. | |
| 2005/0204175 A1 | 9/2005 | Burton | |
| 2005/0210905 A1 | 9/2005 | Burns et al. | |
| 2006/0242447 A1* | 10/2006 | Radhakrishnan et al. | 713/501 |

OTHER PUBLICATIONS

Gunther, S., et al., "Managing the Impact of Increasing Microprocessor Power Consumption," Intel Technology Journal Q1, 2001, pp. 1-9.

Samson, E., et al., "Interface Material Selection and a Thermal Management Technique in Second-Generation Platforms Built on Intel Centrino Mobile Technology," Intel Technology Journal, vol. 9, Issue 1, 2005, pp. 75-86.

\* cited by examiner

*Primary Examiner* — Mark Paschall

(57) ABSTRACT

Whether a temperature of a portion of a die of an integrated circuit device having a central processing device and one or more peripheral components has exceeded a first temperature threshold is determined. In response to determining that the temperature of the portion of the die has exceeded the first temperature threshold, a first thermal reduction process for a first peripheral component of the one or more peripheral components is selected and the first thermal reduction process for the first peripheral component is implemented.

20 Claims, 2 Drawing Sheets

THERMAL THROTTLING OF PERIPHERAL COMPONENTS IN A PROCESSING DEVICE

FIELD OF THE DISCLOSURE

The present disclosure relates generally to thermal management in processing systems and more particularly to thermal throttling of processing devices.

BACKGROUND

Conventional thermal throttling techniques for processing devices rely on the modulation of the performance of the central processing unit (CPU) so as to prevent the processing device from overheating. The CPU typically is modulated by changing the voltage supplied, by clock gating the CPU or by reducing the operational frequency of the CPU. While this can return the processing device to normal thermal operating parameters, the overall performance of the processing device can be severely and detrimentally affected due to the CPU's significant role in overall processing performance. To illustrate, in these conventional thermal throttling techniques, the performance of the CPU is throttled whenever the temperature approaches a maximum limit, thereby resulting in underutilization of processing resources over time. The suboptimal performance of conventional thermal throttling techniques is of particular significance in processing devices whereby the CPU contributes a relatively small fraction of the overall thermal output of the processing device. In such devices, the performance degradation when throttling the CPU is disproportionate to the reduction in thermal output afforded by throttling the CPU. Accordingly, improved techniques for managing the thermal parameters of a processing device would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
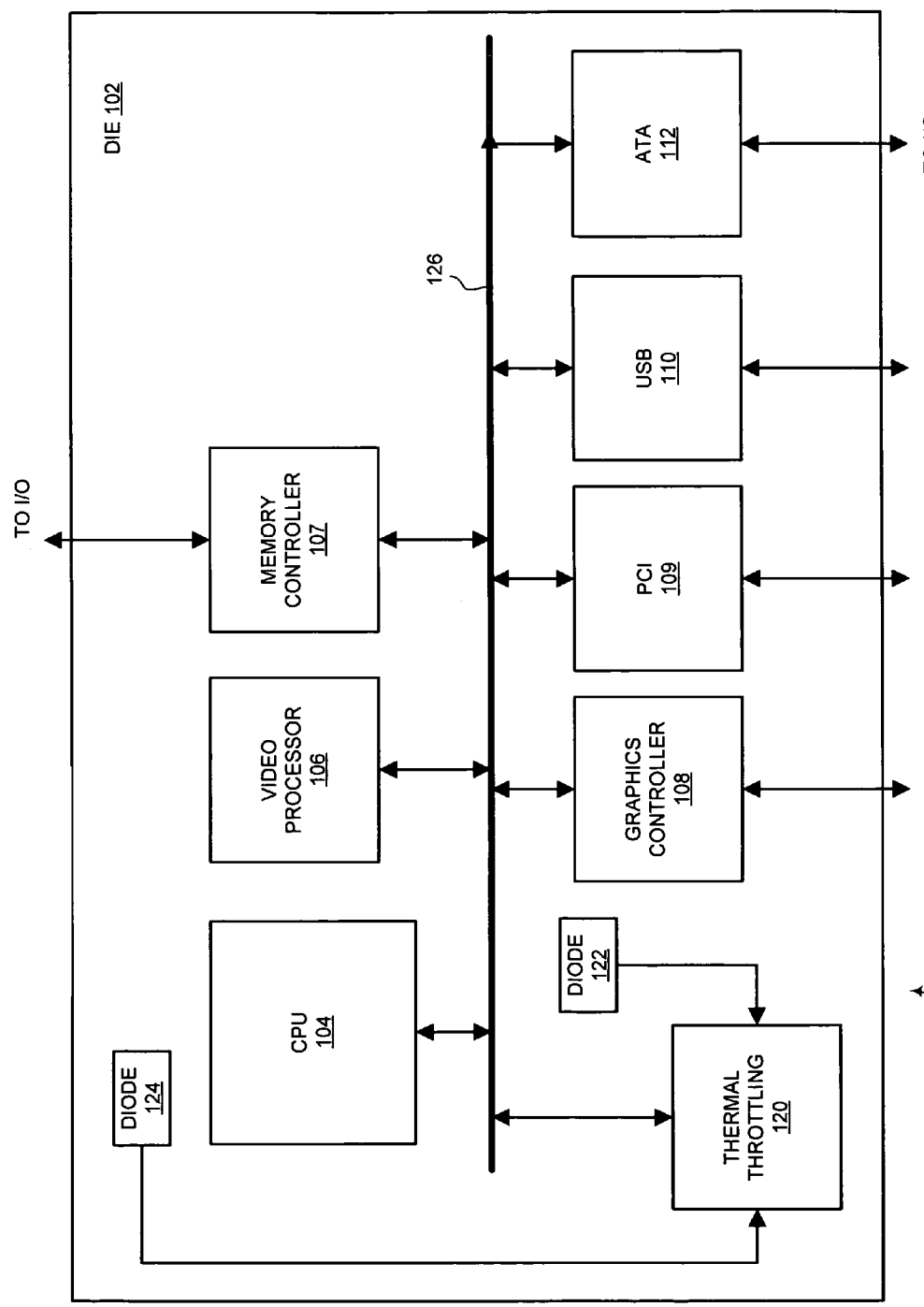
FIG. 1 is a block diagram illustrating an exemplary integrated circuit device utilizing peripheral component thermal throttling in accordance with at least one embodiment of the present disclosure.

The following description is intended to convey a thorough understanding of the present disclosure by providing a number of specific embodiments and details involving thermal throttling in processing devices. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method includes determining whether a temperature of a portion of a die of an integrated circuit device has exceeded a first temperature threshold, wherein the integrated circuit device comprises a central processing unit and one or more peripheral components. The method further includes, in response to determining that the temperature of the portion of the die has exceeded the first temperature threshold, selecting a first thermal reduction process for a first peripheral component of the one or more peripheral components and implementing the first thermal reduction process for the first peripheral component.

In accordance with another aspect of the present disclosure, an integrated circuit device includes a central processing unit disposed at a die, a plurality of peripheral components disposed at the die, a thermal diode disposed at the die, and a thermal throttling component disposed at the die and operably connected to the thermal diode. In one embodiment, the thermal throttling component is to determine whether a temperature of a portion of the die has exceed a first temperature threshold based on an output of the thermal diode. The thermal throttling component further is to, in response to a determination that the temperature of the portion of the die has exceeded the first temperature threshold, select a first thermal reduction process for a first peripheral component of the plurality of peripheral components and implement the first thermal reduction process for the first peripheral component.

In accordance with yet another aspect of the present disclosure, a method includes operating a central processing unit of an integrated circuit device in a first operational mode during a first time period, operating a first peripheral component of the integrated circuit device in a second operational mode during the first time period, and determining whether a temperature of a portion of a die of the integrated circuit device has exceeded a first temperature threshold, wherein the central processing unit and the first peripheral component are disposed at the die. The method further includes, in response to determining that the temperature of the portion of the die has exceeded the first temperature threshold, operating the central processing unit in the first operational mode during a first time period subsequent to the first time period and operating the peripheral component of the integrated circuit device in a third operational mode during the second time period, wherein the peripheral component has a lower thermal output in the third operational mode than in the second operational mode.

Figure 2:
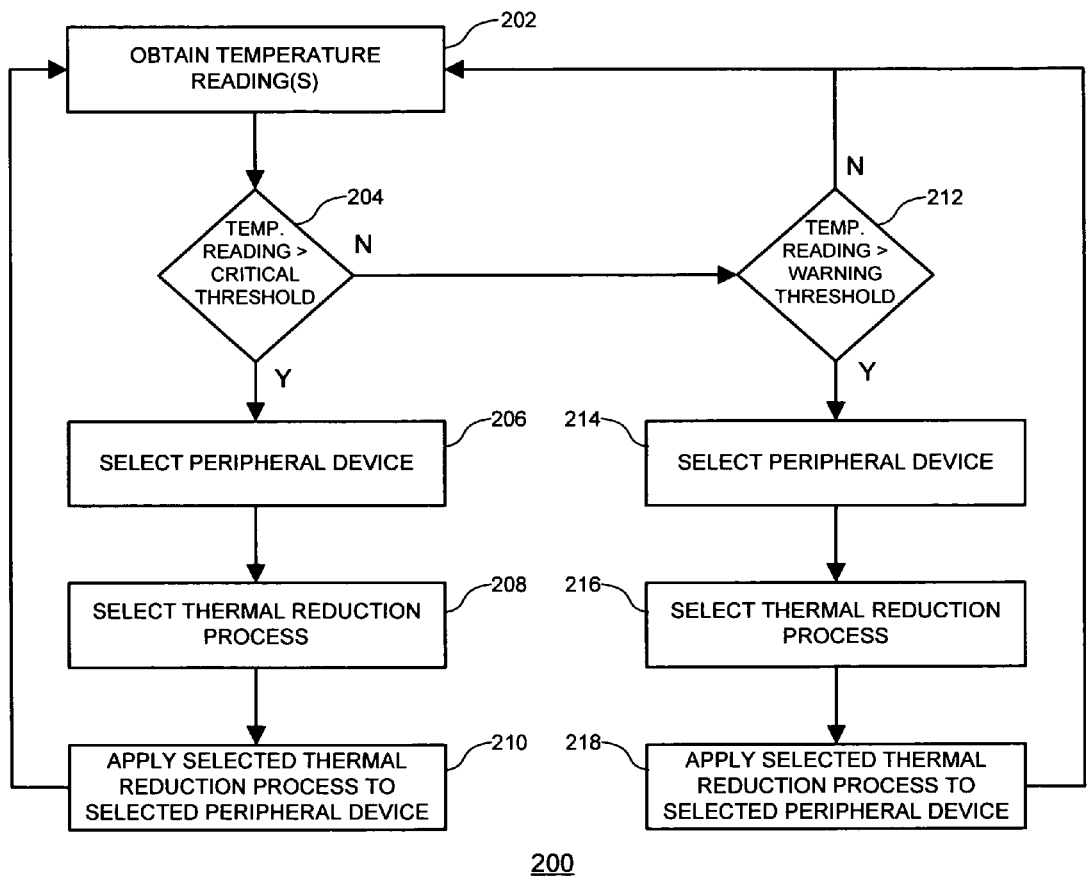
FIG. 2 is a flow diagram illustrating an exemplary peripheral component thermal throttling method in accordance with at least one embodiment of the present disclosure.

FIGS. 1 and 2 illustrate exemplary techniques for thermal management in a processing device by throttling the peripheral components of the processing device disposed at the same die as a central processing unit (CPU) of the processing device. In at least one embodiment, when the temperature of the die (or a portion thereof) is determined to exceed a certain temperature threshold, a thermal reduction process is selected for a peripheral component and then implemented at the peripheral component so as to reduce its thermal output. The term "thermal reduction process," as used herein, is defined as an operational mode that is applied at, implemented by, or associated with a peripheral component so as to reduce thermal energy output. In the event that the reduction in the thermal output resulting from the implementation of the thermal reduction process is not sufficient, another thermal reduction process may be implemented at the same peripheral component, a thermal reduction process may be implemented at another peripheral component, or a thermal reduction process may be implemented at the CPU. Further, in at least one embodiment, multiple temperature thresholds may be implemented, where certain peripheral components and/or thermal reduction processes are associated with a corresponding temperature threshold.

Referring to FIG. 1, an exemplary integrated circuit device 100 is illustrated in accordance with at least one embodiment of the present disclosure. The integrated circuit device 100 can be implemented as, for example, a system-on-a-chip (SOC) and can include any of a variety of integrated circuit-based processing devices, such as a general processor, a multimedia processor, an embedded processor, and the like.

As depicted, the device 100 includes a die 102 and a CPU 104 disposed at the die 102. Also disposed at the die 102 are a plurality of peripheral components, such as a video processor 106, a memory controller 107, a graphics controller 108, a peripheral component interconnect (PCI) (or PCI-Express) interface 109, a universal serial bus (USB) interface 110, an advance technology attachment (ATA) interface 112, and the like. The device 100 further comprises a thermal throttling module 120 connected to one or more thermal diodes 122, 124 disposed at one or more locations of the die 102. The thermal throttling module 120 may be implemented as hardware, software, firmware, or a combination thereof. To illustrate, the thermal throttling module 120 may be implemented, in whole or in part, as a combinatorial logic disposed at the die 102. Alternately, the thermal throttling module 120 may be implemented as a computer program stored in a memory (not shown), where the instructions of the computer program manipulate the CPU 104 or another processor of the device 100 to perform the techniques described herein.

For ease of illustration, some of the components of the device 102 are illustrated as interconnected via a master bus 126. However, those skilled in the art will recognize that the components of the device 102 may be interconnected in any of a variety of ways. Moreover, the packaging, pins and many of the input/output connections of the device 100 are omitted for clarity.

In operation, the thermal throttling module 120 receives output signals from the thermal diodes 122, 124 and determines the temperature of the corresponding locations of the die 102 based on these output signals. Based on one or more of the temperature readings, the thermal throttling module 120 determines whether the die 102 (or a particular portion thereof) is overheated. In one embodiment, the temperature readings are averaged and the averaged temperature is used to detect an overheating condition. In another embodiment, each temperature is used separately to determine whether a corresponding portion of the die 102 is excessively hot. The multiple temperature readings can be compared to a common set of one or more temperature thresholds. Alternately, each measured portion of the die 102 may have a separate set of temperature thresholds tailored to the components located at the corresponding die portion. To illustrate, portions of the die 102 around certain peripheral components (e.g., the portion of the die 102 at which the graphics controller 108 is disposed, as measured by diode 122) may have a higher maximum temperature threshold than the portion of the die 102 at which the CPU 104 is disposed (and measured by diode 124) in the event that the graphics controller 108 can tolerate higher temperatures than the CPU 104.

In the event that the thermal throttling module 120 determines that the temperature of a portion of the die 102 has exceeded a corresponding temperature threshold, the thermal throttling module 120 initiates one or more processes to reduce the thermal output of one or more components of the device 100, thereby reducing the temperature of the die 102. The thermal throttling module 120, in one embodiment, throttles the operating modes of one or more peripheral components before throttling the CPU 104 if the throttling of the one or more peripheral components proves ineffective in reducing the temperature of the portion of the die 102. Accordingly, the thermal throttling module 120 maintains the CPU 104 in the same operational mode during certain time periods while changing the operational modes of one or more peripheral components during the same time periods so as to reduce their overall thermal output.

As part of the throttling process, the thermal throttling module 120 selects a peripheral component to throttle. The peripheral component may be selected based on which temperature threshold of an increasing sequence of thresholds is exceeded. To illustrate, the thermal throttling module 120 may implement two temperature thresholds, one higher than the other, where certain peripheral components and/or thermal reduction processes are associated with a corresponding one of the two temperature thresholds. The association of a peripheral component to a particular temperature threshold may be based on a variety of characteristics, such as the priority or criticality of the peripheral component, the thermal output of the peripheral component, and the like. Similarly, the association of a thermal reduction process to a particular temperature threshold may be based on the thermal reduction expected to result from its implementation, it complexity, and the like. To illustrate, the video processor 106, memory controller 107 and graphics controller 108 may be identified as being more critical to the operation of the device 102 than, for example, the PCI interface 109, the USB interface 110 and the ATA interface 112. Accordingly, when only the lower of the two temperature thresholds has been exceeded, the thermal throttling module 120 may be limited to selecting only between the PCI interface 109, the USB interface 110 and the ATA interface 112 so as to prevent any degradation to the performance of the more critical video processor 106, memory controller 107 and graphics controller 108. Furthermore, in this example, that the higher of the two temperature thresholds also is exceed may indicate that the die 102 has reached a critical temperature and the thermal throttling module 120 accordingly may be permitted to select from any of the peripheral components 106-112 so as to reduce the temperature of the die 102 as effectively as possible. Certain thermal reduction processes can be associated with certain temperature threshold in a similar manner. To illustrate, some thermal reduction processes may be expected to reduce the thermal output of a peripheral component to a greater extent than other thermal reduction processes or certain thermal reduction processes may be expected to cause less performance degradation than other thermal reduction processes and these thermal reduction processes may be associated with lower or higher temperature thresholds accordingly.

The correspondence between temperature thresholds and peripheral devices/thermal reduction processes may be implemented as a table or other data structure stored at the thermal throttling module 120 or other storage component of the device 102. After each thermal diode is polled, the measured temperature is used to perform a table lookup to determine whether a threshold has been exceeded and to identify a peripheral component and/or thermal reduction process. Accordingly, in one embodiment, the thermal throttling module 120 may be implemented as both hardware and software portions where the hardware portion polls the diodes 124 and generates an interrupt in the event that a threshold has been exceeded and where the software portion is implemented as an interrupt handing routine by the CPU 104 that is responsive to interrupts generated by the hardware portion.

In certain instances, multiple throttling processes may need to be implemented in order to bring the temperature of die 102 below a desired threshold. The thermal throttling module 120, in one embodiment, may repeatedly select the same peripheral component and implement increasingly disruptive thermal reduction processes at the peripheral component until the thermal output of the peripheral device is reduced enough to bring down the temperature of the die 102. Alternately, the thermal throttling module 120 may select a different peripheral component for each throttling iteration until the desired die temperature is reached. To illustrate, in one embodiment, the thermal throttling module 120 selects a peripheral component for throttling based on its operating capacity, where a peripheral component operating a full capacity is more likely to be selected than a peripheral component that is already operating at a degraded capacity. Other techniques, such as a round-robin selection technique, may be implemented.

The thermal reduction process implemented by the thermal throttling module 120 may depend on whether it may be applied to a selected peripheral component, the expected degradation in performance of the peripheral component to which it is to be applied, or the expected reduction in thermal output of the peripheral component to which it is to be applied. To illustrate, certain peripheral components may be clocked, in which case an applicable thermal reduction process may include clock gating a selected peripheral component or reducing its effective clock frequency.

As another example, certain peripheral components may receive one or more operations from other components. To illustrate, the memory controller 107 may have memory access operations (memory reads/writes) from the CPU 104 or other peripheral components, and the interfaces 109-112 may have various data transfer operations to perform. In these instances, applicable thermal reduction processes may include reducing the number of operations to be performed (e.g., by dropping operations or by directing other components to stop issuing new operations) or by elimination operations altogether.

As another example, certain peripheral components may be capable of operating over a range of voltages. Because the voltage supplied to a peripheral component often corresponds to the thermal output of the peripheral component, thermal reduction processes for these peripheral components can include reducing the supplied voltage. As yet another example, certain peripheral devices operate to transfer data over one or more busses. To illustrate, the memory controller 107, the graphics controller 108, and the interfaces 109-112 transfer data via I/O busses connected to pins of the device 100, which in turn are connected to various external devices. Accordingly, applicable thermal reduction processes for these peripheral components can include a reduction in the data transfer rate on the I/O busses either by reducing the number of transactions per unit time or by reducing the number of bits transferred over the I/O busses by reducing the number of lines of the I/O busses that are active at any given time.

As yet another example, the thermal reduction processes may be implemented as a change in the format of data manipulated by a peripheral component. To illustrate, the color depth of video data may be reduced so as to reduce the total amount of data processed by the video processor 106 and the memory controller 107. Likewise, a thermal reduction process applicable to the graphics controller 108 can include a reduction in the display refresh rate so as to reduce processing effort at the graphics controller 108.

Referring to FIG. 2, an exemplary method 200 for thermal throttling an integrated circuit device comprising a CPU and a plurality of peripheral components disposed at a common die is illustrated. In the following example, it is assumed that there are two temperature thresholds, a critical temperature threshold whereby damage to the integrated circuit device is imminent and a warning temperature threshold whereby damage to the integrated circuit may result over time. Those skilled in the art can implement more or fewer thresholds using the guidelines provided herein without departing from the scope of the present disclosure.

The method 200 includes obtaining temperature readings from one or more locations of the die at block 202. The temperature readings may be obtained from one or more diodes disposed at various locations of the die. At block 204, the temperature readings are compared with the critical temperature threshold to determine whether a temperature of at least a portion of the die is operating at or above the critical temperature. If so, a peripheral device is selected for throttling at block 206 and a thermal reduction process to apply to the selected peripheral device is selected at block 208. Due to the fact that the die is at a critical temperature, the peripheral component and thermal reduction process are selected so as to maximize to the extent possible the reduction in thermal energy applied to the die. To illustrate, certain peripheral components may radiate significantly more thermal energy than other peripheral components and certain thermal reduction processes may reduce the thermal output of a peripheral device more than others. Accordingly, in one embodiment, the most effective pairing of peripheral component and thermal reduction process is selected at blocks 206 and 208. At block 210, the selected thermal reduction process is applied to the selected peripheral device and the method 200 returns to block 202 to determine whether additional throttling is needed.

In the event that the critical temperature threshold is not exceeded, the measured temperature reading(s) are compared with the warning temperature threshold at block 212. If the warning temperature threshold also is not exceeded, the method returns to block 202 for the next period. Otherwise, a peripheral component is selected for throttling at block 214 and the thermal reduction process to be applied to the selected peripheral component is selected at block 216. In contrast to the selections made at blocks 206 and 208 in response to the die temperature exceeding the critical temperature threshold, the peripheral component/thermal reduction process selections made at blocks 214 and 216, respectively, can be made in an attempt to minimize performance degradation of the device. At block 218, the selected thermal reduction process is applied to the selected peripheral device so as to reduce its thermal output. The method 200 then returns to block 202 for the next period.

The method 200 may be iteratively applied so as to reduce the temperature of the die by repeatedly applying a thermal reduction process to one or more peripheral devices. As noted above, a different peripheral device may be selected for each iteration using, for example, a round-robin selection technique, or multiple thermal reduction processes may be applied to the same peripheral component until a different peripheral device is selected for throttling. Further, in at least one embodiment, the CPU of the device may be throttled after one or more iterations of peripheral component throttling so as to prevent excessive performance degradation of the peripheral components.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining whether a temperature of a portion of a die of an integrated circuit device has exceeded a first temperature threshold, wherein the integrated circuit device comprises a central processing unit and one or more peripheral components; and
   in response to determining that the temperature of the portion of the die has exceeded the first temperature threshold:
      selecting a first thermal reduction process for a first peripheral component of the one or more peripheral components; and
      implementing the first thermal reduction process for the first peripheral component.

2. The method of claim 1, further comprising implementing a second thermal reduction process for the central processing unit in response to determining that the temperature of the portion of the die continues to exceed the first temperature threshold after the first thermal reduction process has been implemented.

3. The method of claim 1, further comprising:
   selecting the first peripheral component from the one or more peripheral components.

4. The method of claim 3, wherein selecting the first peripheral component comprises selecting the first peripheral from one or more peripheral components based on operating capacity.

5. The method of claim 4, wherein the first peripheral component is selected from the one or more peripheral components operating using a round-robin selection process.

6. The method of claim 1, wherein selecting the first thermal reduction process comprises selecting a thermal reduction process expected to have the lowest performance degradation of a plurality of thermal reduction processes applicable to the first peripheral component, wherein the first thermal reduction process comprises the selected thermal reduction processes.

7. The method of claim 1, further comprising:
   determining whether the temperature of the portion of the die has exceeded a second temperature threshold higher than the first temperature threshold; and
   in response to determining that the temperature of the portion of the die has exceeded the second temperature threshold:
      selecting a second thermal reduction process for a second peripheral component of the one or more peripheral components; and
      implementing the second thermal reduction process for the second peripheral component.

8. The method of claim 1, wherein selecting the second thermal reduction process comprises selecting a thermal reduction process expected to have the greatest thermal reduction of a plurality of thermal reduction processes applicable to the second peripheral component, wherein the second thermal reduction process comprises the selected thermal reduction processes.

9. The method of claim 8, further comprising implementing a third thermal reduction process for the central processing unit in response to determining that the temperature of the portion of the die continues to exceed the first temperature threshold and the second temperature threshold after the first thermal reduction process and the second thermal reduction process have been implemented.

10. The method of claim 1, wherein the first peripheral component comprises at least one of a bus interface, a graphics controller, a universal serial bus interface, a video processor, a memory controller, a PCI bus interface, a PCI express bus interface, an ATA bus interface, or a display interface.

11. The method of claim 1, wherein the first thermal reduction process comprises at least one of reducing a number of operations to be performed by the first peripheral component, reducing a power provided to the first peripheral component, reducing an operating frequency of a bus associated with the first thermal reduction process, reducing a bandwidth of the first peripheral component, or reducing a number of operations that one or more other peripheral components can receive from the first peripheral component.

12. The method of claim 1, wherein the first peripheral component comprises a video processor and the first thermal reduction process comprises reducing a color depth of video data processed by the video processor.

13. The method of claim 1, wherein the first peripheral component comprises a graphics controller and the first thermal reduction process comprises reducing a display refresh rate.

14. An integrated circuit device comprising:
   a central processing unit disposed at a die;
   a plurality of peripheral components disposed at the die;
   a thermal diode disposed at the die; and
   a thermal throttling component disposed at the die and operably connected to the thermal diode, wherein the thermal throttling component is to:
      determine whether a temperature of a portion of the die has exceed a first temperature threshold based on an output of the thermal diode; and
      in response to a determination that the temperature of the portion of the die has exceeded the first temperature threshold:
         select a first thermal reduction process for a first peripheral component of the plurality of peripheral components; and
         implement the first thermal reduction process for the first peripheral component.

15. The integrated circuit device of claim 14, wherein the thermal throttling module further is to implement a second thermal reduction process for the central processing unit in response to a determination that the temperature of the portion of the die continues to exceed the first temperature threshold after the first thermal reduction process has been implemented.

16. The integrated circuit device of claim 14, wherein the thermal throttling module further is to select the first peripheral component from the one or more peripheral components.

17. The integrated circuit device of claim 14, wherein the thermal throttling module further is to:
   determine whether the temperature of the portion of the die has exceeded a second temperature threshold higher than the first temperature threshold; and
   in response to a determination that the temperature of the portion of the die has exceeded the second temperature threshold:
      select a second thermal reduction process for a second peripheral component of the plurality of peripheral components; and
      implement the second thermal reduction process for the second peripheral component.

18. A method comprising:
   operating a central processing unit of an integrated circuit device in a first operational mode during a first time period;
   operating a first peripheral component of the integrated circuit device in a second operational mode during the first time period;

determining whether a temperature of a portion of a die of the integrated circuit device has exceeded a first temperature threshold, wherein the central processing unit and the first peripheral component are disposed at the die; and in response to determining that the temperature of the portion of the die has exceeded the first temperature threshold:

operating the central processing unit in the first operational mode during a first time period subsequent to the first time period;

operating the first peripheral component of the integrated circuit device in a third operational mode during the second time period, wherein the first peripheral component has a lower thermal output in the third operational mode than in the second operational mode.

19. The method of claim 18, further comprising:

determining whether the temperature of a portion of the die has exceeded a second temperature threshold; and in response to determining that the temperature of the portion of the die has exceeded the second temperature threshold, operating the central processing unit in a fourth operational mode during a third time period subsequent to the first time period, wherein the central processing unit has a lower thermal output in the fourth operational mode than in the first operational mode.

20. The method of claim 18, further comprising:

operating a second peripheral component of the integrated circuit device in a fourth operational mode during the first time period, wherein the second peripheral component is disposed at the die;

determining whether the temperature of a portion of the die has exceeded a second temperature threshold; and in response to determining that the temperature of the portion of the dies has exceeded a second temperature threshold:

operating the central processing unit in the first operational mode during a third time period subsequent to the first time period; and operating the second peripheral component in a fifth operational mode during the third time period, wherein the second peripheral component has a lower thermal output in the fifth operational mode than in the fourth operational mode.

* * * * *